US010449943B2

(12) United States Patent
Okano et al.

(10) Patent No.: US 10,449,943 B2
(45) Date of Patent: Oct. 22, 2019

(54) ABNORMALITY DETECTION DEVICE

(71) Applicants: ADVICS CO., LTD., Kariya-shi, Aichi (JP); TOYOTA JIDOSHA KABUSHIKI KAISHA, Toyota-shi, Aichi (JP)

(72) Inventors: Takahiro Okano, Chiryu (JP); Yusuke Kamiya, Okazaki (JP); Masaaki Komazawa, Miyoshi (JP); Takeshi Okawa, Toyota (JP)

(73) Assignees: ADVICS CO., LTD., Kariya-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 51 days.

(21) Appl. No.: 15/754,862

(22) PCT Filed: Aug. 25, 2016

(86) PCT No.: PCT/JP2016/074825
§ 371 (c)(1),
(2) Date: Feb. 23, 2018

(87) PCT Pub. No.: WO2017/038626
PCT Pub. Date: Mar. 9, 2017

(65) Prior Publication Data
US 2018/0244254 A1   Aug. 30, 2018

(30) Foreign Application Priority Data
Aug. 28, 2015   (JP) .................................. 2015-169236

(51) Int. Cl.
*B60T 17/22*   (2006.01)
*B60T 7/04*   (2006.01)
(Continued)

(52) U.S. Cl.
CPC ............ *B60T 17/221* (2013.01); *B60T 7/042* (2013.01); *B60T 8/00* (2013.01); *B60T 8/17* (2013.01);
(Continued)

(58) Field of Classification Search
CPC ...... B60T 17/221; B60T 8/885; B60T 13/662; B60T 13/146; B60T 8/17; B60T 8/00;
(Continued)

(56) References Cited

U.S. PATENT DOCUMENTS 5,032,995 A * 7/1991 Matsuda ............ B60K 23/0808
180/233
5,754,970 A * 5/1998 Takasaki ............ B60K 23/0808
180/233

(Continued)

FOREIGN PATENT DOCUMENTS

JP   2007-216773 A   8/2007
JP   2007-283836 A   11/2007
(Continued)

OTHER PUBLICATIONS

Office Action (Notification of Reasons for Refusal) dated May 8, 2018, by the Japanese Patent Office in corresponding Japanese Patent Application No. 2015-169236, and an English Translation of the Office Action. (4 pages).

(Continued)

*Primary Examiner* — Muhammad Shafi
(74) *Attorney, Agent, or Firm* — Buchanan Ingersoll & Rooney PC

(57) ABSTRACT

A brake ECU (abnormality detection device) includes: an operating amount obtaining portion configured to obtain a measurement value of a stroke; a hydraulic pressure obtaining portion configured to obtain a measurement value of a reaction force hydraulic pressure having a mutual relation- (Continued)

ship with respect to the stroke; an operation direction determining portion configured to determine directions of operation of outputs from a stroke sensor and a pressure sensor; a failure detection range switching portion configured to switch the failure detection range for detecting failures of a hydraulic pressure braking force generating device in accordance with the direction of operation; and a failure determining portion configured to determine the failure of the hydraulic pressure braking force generating device from the failure detection range switched by the failure detection range switching portion, the measurement value of the stroke, and the measurement value of the reaction force hydraulic pressure.

6 Claims, 7 Drawing Sheets

(51) Int. Cl.
| | | |
|---|---|---|
| *B60T 8/00* | (2006.01) | |
| *B60T 8/17* | (2006.01) | |
| *B60T 13/14* | (2006.01) | |
| *B60T 13/66* | (2006.01) | |
| *B60T 13/68* | (2006.01) | |
| *B60T 8/88* | (2006.01) | |
| B60T 8/40 | (2006.01) | |
| B60T 8/94 | (2006.01) | |

(52) U.S. Cl.
CPC ............ *B60T 8/885* (2013.01); *B60T 13/146* (2013.01); *B60T 13/662* (2013.01); *B60T 13/686* (2013.01); *B60T 17/22* (2013.01); B60T 8/4077 (2013.01); B60T 8/94 (2013.01); B60T 2270/403 (2013.01); B60T 2270/413 (2013.01)

(58) Field of Classification Search
CPC ........ B60T 7/042; B60T 13/686; B60T 17/22; B60T 2270/403; B60T 2270/413; B60T 8/94; B60T 8/4077
USPC ....................................................... 701/34.4
See application file for complete search history.

(56) References Cited

U.S. PATENT DOCUMENTS

| 6,422,088 B1* | 7/2002 | Oba ..................... G01D 3/08 73/754 |
|---|---|---|
| 2007/0188019 A1 | 8/2007 | Maki et al. |
| 2007/0228821 A1 | 10/2007 | Maki et al. |
| 2008/0232015 A1* | 9/2008 | Wakabayashi .......... B60T 8/321 361/79 |
| 2009/0066494 A1* | 3/2009 | Ishikawa ............. G01S 7/52004 340/438 |
| 2009/0179605 A1* | 7/2009 | Kanekawa ............... G01D 5/20 318/490 |
| 2015/0120161 A1 | 4/2015 | Kamiya et al. |
| 2016/0200355 A1* | 7/2016 | Mori .................... B62D 5/0484 180/446 |

FOREIGN PATENT DOCUMENTS

| JP | 2012-224332 A | 11/2012 |
|---|---|---|
| JP | 2013-208987 A | 10/2013 |
| JP | 2007-283836 | * 11/2017 |

OTHER PUBLICATIONS

International Search Report (PCT/ISA/210) dated Oct. 4, 2016, by the Japanese Patent Office as the International Searching Authority for International Application No. PCT/JP2016/074825.
Written Opinion (PCT/ISA/237) dated Oct. 4, 2016, by the Japanese Patent Office as the International Searching Authority for International Application No. PCT/JP2016/074825.

* cited by examiner

ABNORMALITY DETECTION DEVICE

TECHNICAL FIELD

The present invention relates to an abnormality detection device.

BACKGROUND ART

A configuration disclosed in Patent Literature 1 is known as one mode of an abnormality detection device. In the abnormality detection device illustrated in FIG. 1 of PTL1, failure detection of a brake system is executed based on a mutual relationship between a measurement value of a stroke sensor 25 and a measurement value of a regulator pressure sensor 71.

CITATION LIST

Patent Literature

PTL1: JP-A-2012-224332

SUMMARY OF INVENTION

Technical Problem

In the abnormality detection device illustrated in the above-described PTL1, as the mutual relationship between the measurement value of the stroke sensor 25 and the measurement value of the regulator pressure sensor 71 has hysteresis, there is a demand for a further improvement of failure detection accuracy of a brake system.

Accordingly, in order to solve the above-described problem, it is an object of the present invention to provide an abnormality detection device improved in failure detection accuracy of a brake system.

Solution to Problem

In order to solve the above-descried problems, the invention of an abnormality detection device according to claim 1 includes: a first detection result obtaining portion configured to obtain a first detection result from a first sensor configured to detect a first detection subject associated with a brake operation in a brake system and increasing with an increase of a brake operating amount or a brake operating force; a second detection result obtaining portion configured to obtain a second detection result from a second sensor configured to detect a second detection subject having a mutual relationship with respect to the first detection subject and associated with the brake operation in the brake system and increasing with an increase of the brake operating amount or the brake operating force; an operation direction determining portion configured to determine a direction of operation of outputs from the first sensor and the second sensor, including an advancing operation direction and a returning operation direction, from the first detection result obtained by the first detection result obtaining portion and the second detection result obtained by the second detection result obtaining portion; a failure detection range switching portion configured to switch a failure detection range for detecting a failure of the brake system caused by an abnormality of a mutual relationship between the first detection subject and the second detection subject in accordance with the direction of operation determined by the operation direction determining portion; and a failure determining portion configured to determine a failure of the brake system from the failure detection range switched by the failure detection range switching portion, the first detection result obtained by the first detection result obtaining portion, and the second detection result obtained by the second detection result obtaining portion.

The invention of the abnormality detection device according to claim 6 includes: a first detection result obtaining portion configured to obtain a first detection result from a first sensor configured to detect a first detection subject associated with a brake operation in the brake system; a second detection result obtaining portion configured to obtain a second detection result from a second sensor configured to detect a second detection subject having a mutual relationship with respect to the first detection subject and associated with the brake operation in the brake system; and a failure determining portion configured to perform failure determination of the brake system from a failure detection range for detecting a failure of the brake system, the first detection result obtained by the first detection result obtaining portion, and the second detection result obtained by the second detection result obtaining portion, wherein the failure determining portion excludes the areas of the first detection result and the second detection result where the failure determination of the brake system has been already performed from a determination target and performs the failure determination of the brake system for the first detection result and the second detection result where the failure determination is not performed, other than the areas thereof where the failure determination has been already performed, while one operation of the brake operation.

Advantageous Effects of Invention

According to the abnormality detection device in claim 1 described above, the failure determining portion is capable of using a failure determining range adequately switched in accordance with the direction of operation of the outputs from the first sensor and the second sensor, and determining the failure of the brake system for each of the operating directions. Consequently, even though there is hysteresis in the mutual relationship between the output from the first sensor and the output from the second sensor, further improvement of the failure detection accuracy of the brake system is achieved.

According to the abnormality detection device in claim 6 described above, further failure determination of the brake system for the areas of the first detection result and the second detection result which had been already determined to be normal in one operation of the brake operation can be omitted. Consequently, further improvement of the failure detection accuracy of the brake system is achieved.

DESCRIPTION OF EMBODIMENTS

First Embodiment

Figure 1:
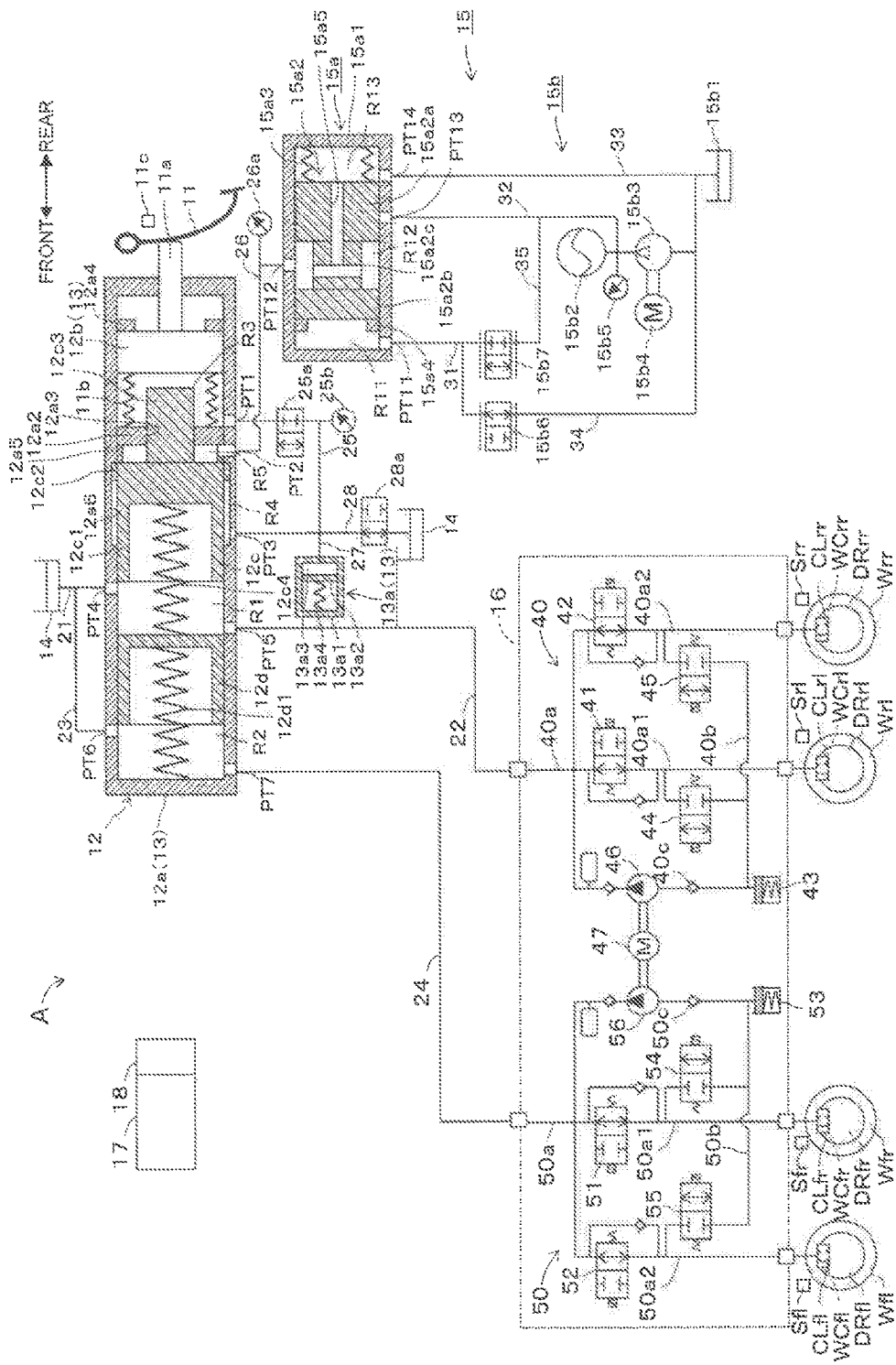
FIG. 1 is a schematic drawing illustrating a first embodiment of an abnormality detection device according to the present invention.
Figure 2:
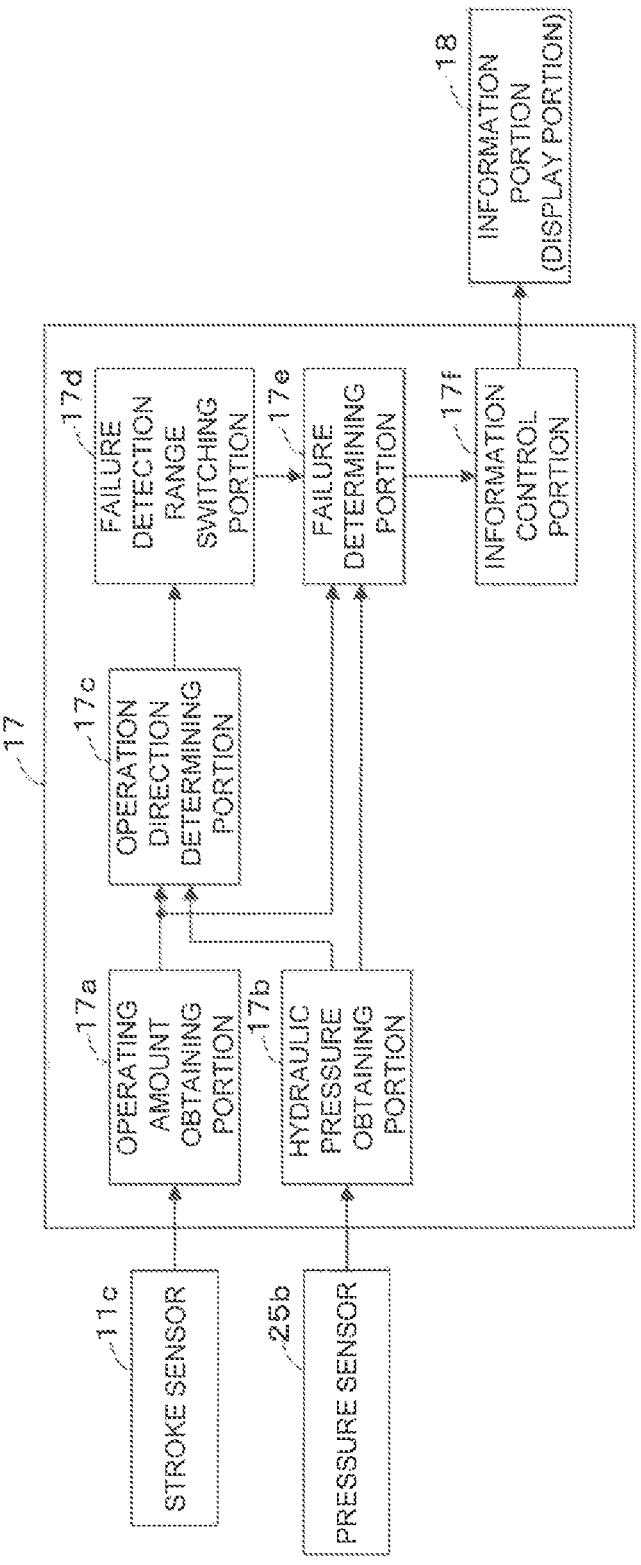
FIG. 2 is a block diagram of a brake ECU illustrated in FIG. 1.

Referring now to drawings, a first embodiment of an abnormality detection device according to the present invention applied to a vehicle will be described. The vehicle is provided with a hydraulic pressure braking force generating device A configured to brake the vehicle by applying a hydraulic braking force directly to wheels Wfl, Wfr, Wrl, and Wrr. As shown in FIG. 1, the hydraulic pressure braking force generating device A includes a brake pedal 11 which is a brake operation member, a master cylinder 12, a stroke simulator portion 13, a reservoir 14, a booster mechanism 15, an actuator (brake hydraulic pressure adjusting device) 16, a brake ECU 17 (abnormality detection device), and a wheel cylinder WC. The hydraulic pressure braking force generating device A is a brake system.

The wheel cylinder WC restricts the rotation of a vehicle wheel W and is provided at a caliper CL. The wheel cylinder WC functions as a braking force applying mechanism which applies braking force to the vehicle wheel W based on the pressure of brake fluid (brake hydraulic pressure) from the actuator 16. When the brake hydraulic pressure is applied to the wheel cylinder WC, each piston (not shown) of the wheel cylinder WC pushes a pair of brake pads (not shown) which is the friction member to sandwich and squeeze a disc rotor DR which is a rotational member rotating unitary with the vehicle wheel W at both sides of the rotor DR to thereby restrict the rotation of the rotor. In this embodiment, a disc type brake system is adopted, but a drum type brake system can be adopted. The vehicle wheel W means any of the front left wheel Wfl, front right wheel Wfr, rear left wheel Wrl and rear right wheel Wrr.

The brake pedal 11 is connected to the stroke simulator portion 13 and the master cylinder 12 via an operating rod 11a.

Provided in the vicinity of the brake pedal 11 is a pedal stroke sensor (may be referred to as a stroke sensor, hereinafter) 11c configured to detect a brake pedal stroke (operating amount: may be referred to as a stroke, hereinafter) which is a brake operating state based on the depression of the brake pedal 11. The stroke is a first detection subject associated with a brake operation in the brake system. The stroke sensor 11c is a first sensor configured to detect the first detection subject. The stroke sensor 11c is connected to the brake ECU 17, and is configured to output a detection signal (detection result) to the brake ECU 17.

The master cylinder 12 supplies the brake fluid with the actuator 16 in response to the operating amount of the brake pedal 11 (brake operating member) and is formed by a cylinder body 12a, an input piston 12b, a first master piston 12c, and a second master piston 12d, etc.

The cylinder body 12a is formed into a bottomed substantially cylindrical shape. The cylinder body 12a includes in the interior thereof a partition wall portion 12a2 having an inwardly projecting flange shape. The partition wall portion 12a2 includes a through hole 12a3 penetrating at a center thereof in a fore-and-aft direction. The cylinder body 12a houses the first master piston 12c and the second master piston 12d so as to be movable along an axial direction in a liquid-tight manner in a portion forward of the partitioning wall portion 12a2.

The cylinder body 12a houses the input piston 12b so as to be movable along the axial direction in a liquid-tight manner in a portion rearward of the partitioning wall portion 12a2. The input piston 12b is a piston sliding in the cylinder body 12a in response to an operation of the brake pedal 11.

The input piston 12b is connected to the operating rod 11a which moves in association with the movement of the brake pedal 11. The input piston 12b is biased by a compression spring 11b in a direction where the volume of a first hydraulic pressure chamber R3 is extended, i.e., in a rearward direction (right direction as viewed in the drawing). When the brake pedal 11 is depressed, the operating rod 11a rooves forward against the biasing force of the compression spring 11b. Along with the advancement of the operating rod 11a, the input piston 12b also advances interlockingly. Also, when the depression of the brake pedal 11 is released, the input piston 12b retreats by the biasing force of the compression spring 11b until it contacts with a restriction projecting portion 12a4 and is positioned thereby.

The first master piston 12c integrally includes a pressurizing cylindrical portion 12c1, a flange portion 12c2, and a projecting portion 12c3 arranged in this order from the front. The pressurizing cylindrical portion 12c1 is formed into a bottomed substantially cylindrical shape opening toward the front, and is disposed in the cylinder body 12a so as to be slidable with respect to an inner peripheral surface thereof in a liquid tight manner. The pressurizing cylindrical portion 12c1 includes a coil spring 12c4, which is a biasing member, disposed in an internal space thereof against the second master piston 12d. The first master piston 12c is biased rearward by the coil spring 12c4. In other words, the first master piston 12c is biased rearward by the coil spring 12c4, and finally is positioned by coming into abutment with a restriction projecting portion 12a5. This position corresponds to an original position (predetermined position) when a depressing operation of the brake pedal 11 is released.

The flange portion 12c2 is formed to have a diameter larger than that of the pressurizing cylindrical portion 12c1, and is disposed so as to be slidable with respect to an inner peripheral surface of a large diameter portion 12a6 in the cylinder body 12a in a liquid tight manner. The projecting portion 12c3 is formed to have a diameter smaller than that of the pressurizing cylindrical portion 12c1, and is disposed in the through hole 12a3 of the partition wall portion 12a2 so as to be slidable in a liquid tight manner. A rear end portion of the projecting portion 12c3 penetrates through the through hole 12a3, projects into an internal space of the cylinder body 12a, and is apart from the inner peripheral surface of the cylinder body 12a. A rear end surface of the projecting portion 12c3 is apart from a bottom surface of the input piston 12b, and the distance therebetween may vary.

The second master piston 12d is disposed forward of the first master piston 12c in the cylinder body 12a. The second master piston 12d is formed into a bottomed substantially cylindrical shape opening forward. The second master piston 12d includes a coil spring 12d1, which is a biasing member, in an internal space of the second master piston 12d against an inner bottom surface of the cylinder body 12a. The second master piston 12d is biased rearward by the coil spring 12d1. In other words, the second master piston 12d is biased by the coil spring 12d1 toward a preset original position.

The master cylinder 12 includes a first master chamber R1, a second master chamber R2, the first hydraulic pressure chamber R3, a second hydraulic pressure chamber R4, and a servo chamber (driving hydraulic pressure chamber) R5.

The first master chamber R1 is partitioned and defined by the inner peripheral surface of the cylinder body 12a, the first master piston 12c (the front side of the pressurizing cylindrical portion 12c1), and the second master piston 12d. The first master chamber R1 is connected to the reservoir 14 via a hydraulic conduit 21 connected to a port PT4. The first master chamber R1 is connected to a hydraulic passage 40a (actuator 16) via a hydraulic conduit 22 connected to a port PT5.

The second master chamber R2 is partitioned and defined by the inner peripheral surface of the cylinder body 12a and a front side of the second master piston 12d. The second master chamber R2 is connected to the reservoir 14 via a hydraulic conduit 23 connected to a port PT6. The second master chamber R2 is also connected to a hydraulic passage 50a (actuator 16) via a hydraulic conduit 24 connected to a port PT7.

The first hydraulic pressure chamber R3 is formed between the partition wall portion 12a2 and the input piston 12b, and is partitioned and defined by the inner peripheral surface of the cylinder body 12a, the partition wall portion 12a2, the projecting portion 12c3 of the first master piston 12c, and the input piston 12b. The second hydraulic pressure chamber R4 is formed laterally of the pressurizing cylindrical portion 12c1 of the first master piston 12c, and is partitioned and defined by the large diameter portion 12a6 of the inner peripheral surface of the cylinder body 12a, the pressurizing cylindrical portion 12c1, and the flange portion 12c2. The first hydraulic pressure chamber R3 is connected to the second hydraulic pressure chamber R4 via a hydraulic conduit 25 connected to a port PT1 and a port PT3.

The servo chamber R5 is formed between the partition wall portion 12a2 and the pressurizing cylindrical portion 12c1 of the first master piston 12c, and is partitioned and defined by the inner peripheral surface and the partition wall portion 12a2 of the cylinder body 12a, and the projecting portion 12c3 and the pressurizing cylindrical portion 12c1 of the first master piston 12c. The servo chamber R5 is connected to an output chamber R12 via a hydraulic conduit 26 connected to a port PT2.

A pressure sensor 26a is a sensor configured to detect a servo pressure (driving hydraulic pressure) supplied to the servo chamber R5, and is connected to the hydraulic conduit 26. A second detection subject is a reaction force hydraulic pressure. The pressure sensor 26a is a second sensor configured to detect the second detection subject. The pressure sensor 26a sends a detection signal (detection result) to the brake ECU 17.

The stroke simulator portion 13 is formed by the cylinder body 12a, the input piston 12b, the first hydraulic pressure chamber R3 and a stroke simulator 13a which is connected to the first hydraulic pressure chamber R3.

The first hydraulic pressure chamber R3 is connected to the stroke simulator 13a via the conduits 25 and 27 which are connected to the port PT1. It is noted that the first hydraulic pressure chamber R3 is connected to the reservoir 14 via a hydraulic conduit (not shown).

The stroke simulator 13a generates a magnitude of stroke (reaction force) at the brake pedal 11 corresponding to the operation state of the brake pedal 11. The stroke simulator 13a is formed by a cylindrical portion 13a1, a piston portion 13a2, a reaction force hydraulic pressure chamber 13a3 and a spring 13a4. The piston portion 13a2 liquid tightly slidably moves in the cylindrical portion 13a1 in response to the brake operation by the brake pedal 11. The reaction force hydraulic pressure chamber 13a3 is partitioned and formed between the cylindrical portion 13a1 and the piston portion 13a2. The reaction force hydraulic pressure chamber 13a3 is connected to the first and the second hydraulic pressure chambers R3 and R4 via the hydraulic conduits 27 and 25. The spring 13a4 biases the piston portion 13a2 in a direction where the volume of the reaction force hydraulic pressure chamber 13a3 decreases.

It is noted that the hydraulic conduit 25 is provided with a first control valve 25a which is a normally closed type electromagnetic valve. A second control valve 28a which is a normally open type electromagnetic valve is provided in a hydraulic conduit 28 which connects the hydraulic conduit 25 and the reservoir 14. When the first control valve 25a is in a closed state, the communication between the first hydraulic pressure chamber R3 and the second hydraulic pressure chamber R4 are interrupted. Under such state, the input piston 12b and the first master piston 12c are moved with a predetermined distance maintained therebetween. Further, when the first control valve 25a is in an open state, the communication between the first hydraulic pressure chamber R3 and the second hydraulic pressure chamber R4 is established, Under this state, the volume change of the first hydraulic pressure chamber R3 and the second hydraulic pressure chamber R4 caused by the advance/retreat movement of the first master piston 12c can be absorbed by the transfer of the brake fluid.

A pressure sensor 25b is a sensor configured to detect a reaction force hydraulic pressure of the second hydraulic pressure chamber R4 and the first hydraulic pressure chamber R3, and is connected to the hydraulic conduit 25. The pressure sensor 25b is also an operating force sensor configured to detect an operating force (having a mutual relationship with respect to the operating amount of the brake pedal 11) with respect to the brake pedal 11. The reaction force hydraulic pressure is the second detection subject having a mutual relationship with respect to the above-described first detection subject and associated with the brake operation in the brake system. The pressure sensor 25b is a second sensor configured to detect the second detection subject. The pressure sensor 25b detects a pressure in the second hydraulic pressure chamber R4 when the first control valve 25a is in the closed state, and detects also a pressure (the reaction force hydraulic pressure) of the first hydraulic pressure chamber R3 communicating therewith when the first control valve 25a is in the opened state. The pressure sensor 25b sends a detection signal (detection result) to the brake ECU 17.

The booster mechanism 15 generates a servo pressure in accordance with the operating amount of the brake pedal 11. The booster mechanism 15 is provided with a regulator 15a and a pressure supplying device 15b.

The regulator 15a includes a cylinder body 15a1 and a spool 15a2 sliding in the cylinder body 15a1. The regulator 15a includes a pilot chamber R11, the output chamber R12, and a hydraulic pressure chamber R13.

The pilot chamber R11 is partitioned and defined by the cylinder body 15a1 and a front end surface of a second large diameter portion 15a2b of the spool 15a2. The pilot chamber R11 is connected to a pressure decreasing valve 15b6 and a pressure increasing valve 15b7 (to a hydraulic conduit 31) connected to a port PT11. An inner peripheral surface of the cylinder body 15*a*1 is provided with a restriction projecting portion 15*a*4 which is positioned by abutment with a front end surface of the second large diameter portion 15*a*2*b* of the spool 15*a*2.

The output chamber R12 is partitioned and defined by the cylinder body 15*a*1, a small diameter portion 15*a*2*c* of the spool 15*a*2, and a rear end surface of the second large diameter portion 15*a*2*b*, and a front end surface of a first large diameter portion 15*a*2*a*. The output chamber R12 is connected to the servo chamber R5 of the master cylinder 12 via the hydraulic conduit 26 connected to a port PT12 and the port PT2. The output chamber R12 is connectable to an accumulator 15*b*2 via a hydraulic conduit 32 connected to a port PT13.

The hydraulic pressure chamber R13 is partitioned and defined by the cylinder body 15*a*1 and a rear end surface of the first large diameter portion 15*a*2*a* of the spool 15*a*2. The hydraulic pressure chamber R13 is connectable to a reservoir 15*b*1 via a hydraulic conduit 33 connected to a port PT14. The hydraulic pressure chamber R13 houses a spring 15*a*3 configured to bias the hydraulic pressure chamber R13 in a direction of extension.

The spool 15*a*2 is formed by the first large diameter portion 15*a*2*a*, the second large diameter portion 15*a*2*b* and the small diameter portion 15*a*2*c*. The first large diameter portions 15*a*2*a* and the second large diameter portion 15*a*2*b* are formed such that they liquid-tightly slide within the cylinder body 15*a*1. The small diameter portion 15*a*2*c* is disposed between the first large diameter portion 15*a*2*a* and the second large diameter portion 15*a*2*b* and is integrally formed with the first large diameter portion 15*a*2*a* and the second large diameter portion 15*a*2*b*. The diameter of the small diameter portion 15*a*2*c* is formed to be smaller than the diameters of the first large diameter portion 15*a*2*a* and the second large diameter portion 15*a*2*b*.

A communication passage 15*a*5 is provided at the spool 15*a*2 to connect the output chamber R12 and the hydraulic pressure chamber R13.

The pressure supplying device 15*b* is also a drive unit configured to drive the spool 15*a*2. The pressure supplying device 15*b* includes the reservoir 15*b*1, which is a low-pressure source, the accumulator 15*b*2, which is a high-pressure source, and configured to accumulate a braking fluid, a pump 15*b*3 configured to suck the braking fluid of the reservoir 15*b*1 and pump the same toward the accumulator 15*b*2, and an electric motor 15*b*4 configured to drive the pump 15*b*3. The reservoir 15*b*1 is opened to the atmosphere, and the hydraulic pressure in the reservoir 15*b*1 is the same as the atmospheric pressure. The low-pressure source provides a lower pressure than the high-pressure source. The pressure supplying device 15*b* includes a pressure sensor 15*b*5 configured to detect the pressure of a brake fluid supplied from the accumulator 15*b*2 and outputs the detected pressure to the brake ECU 17.

The pressure supplying device 15*b* is further provided with the pressure decreasing valve 15*b*6 and a pressure increasing valve 15*b*7. The pressure decreasing valve 15*b*6 is an electromagnetic valve of a structure (normally-open type) opening in a non-energized state, a flow rate of which is controlled by a command from the brake ECU 17. One side of the pressure decreasing valve 15*b*6 is connected to the pilot chamber R11 via the hydraulic conduit 31, and the other side of the pressure decreasing valve 15*b*6 is connected to the reservoir 15*b*1 via a hydraulic conduit 34. The pressure increasing valve 15*b*7 is an electromagnetic valve of a structure (normally-close type) closing in the non-energized state, a flow rate of which is controlled by a command from the brake ECU 17. One side of the pressure increasing valve 15*b*7 is connected to the pilot chamber R11 via the hydraulic conduit 31, and the other side of the pressure increasing valve 15*b*7 is connected to the accumulator 15*b*2 via a hydraulic conduit 35 and the hydraulic conduit 32 connected to the hydraulic conduit 35.

The operation of the regulator 15*a* will be briefly described hereinafter. When no pilot pressure is supplied from the pressure decreasing valve 15*b*6 and the pressure increasing valve 15*b*7 to the pilot chamber R11, the spool 15*a*2 is biased by the spring 15*a*3 and is located at the original position (see FIG. 1). The original position of the spool 15*a*2 is a position where a front end surface of the spool 15*a*2 is positioned by coming into abutment with the restriction projecting portion 15*a*4 and a position immediately before a position where a rear end surface of the spool 15*a*2 closes the port PT14.

Thus, when the spool 15*a*2 is at the original position, the port PT14 and the port PT12 are in communication with each other via the communication passage 15*a*5, and the port PT13 is closed by the spool 5*a*2.

When the pilot pressure established by the pressure decreasing valve 15*b*6 and the pressure increasing valve 15*b*7 in accordance with the operating amount of the brake pedal 11 increases, the spool 15*a*2 moves rearward (rightward in FIG. 1) against a biasing force of the spring 15*a*3. Accordingly, the spool 15*a*2 is then moved to a position where the port PT13, which has been closed, opens. The port PT14, which has been opened, is closed by the spool 15*a*2 (Pressure increasing operation).

The spool 15*a*2 is positioned by a pressing force of the front end surface of the second large diameter portion 15*a*2*b* of the spool 15*a*2 and a force corresponding to the servo pressure well balanced to each other. The position of the spool 15*a*2 at this time is referred to as a maintaining position. The port PT13 and the port PT14 are closed by the spool 15*a*2 (Pressure maintaining operation).

When the pilot pressure established by the pressure decreasing valve 15*b*6 and the pressure increasing valve 15*b*7 in accordance with the operating amount of the brake pedal 11 decreases, the spool 15*a*2 at the maintaining position is moved forward by the biasing force of the spring 15*a*3. Then, the port PT13 closed by the spool 15*a*2 is maintained in the closed state. The port PT14 which has been closed are opened. At this time, the port PT14 and the port PT12 communicate with each other via the communication passage 15*a*5 (Pressure decreasing operation).

The actuator 16 is a device for adjusting a brake hydraulic pressure to be applied to each wheel cylinder WC, and is provided with first and second conduit systems 40 and 50. The first conduit system 40 controls the brake hydraulic pressure applied to the rear-left wheel Wrl and the rear-right wheel Wrr, and the second conduit system 50 controls a brake hydraulic pressure applied to the front-right wheel Wfr and the front-left wheel Wfl. In other words, the configuration of conduit is fore-and-aft conduit.

The hydraulic pressure supplied from the master cylinder 12 is transmitted to each wheel cylinders WCrl, WCrr, WCfr, and WCfl through the first conduit system 40 and the second conduit system 50. The first conduit system 40 is provided with the hydraulic passage 40*a* which connects the wheel cylinders WCrl and WCrr and the hydraulic conduit 22. The second conduit system 50 is provided with the hydraulic passage 50*a* which connects the wheel cylinders WCfr, and WCfl and the hydraulic conduit 24. The hydraulic pressure from the master cylinder 12 is transmitted to each wheel cylinders WCrl, WCrr, WCfr, and WCfl through these hydraulic passages 40*a* and 50*a*, respectively.

The hydraulic passages 40*a* and 50*a* are branched off to respective two hydraulic passages 40*a*1, 40*a*2, 50*a*1, and 50*a*2, respectively. The hydraulic passages 40*a*1 and 50*a*1 are provided with first pressure increasing valves 41 and 51 which control the pressure increase of the brake hydraulic pressure to each wheel cylinders WCrl and WCfr, respectively. Another each hydraulic passage 40*a*2 and 50*a*2 is provided with the second pressure increasing valves 42 and 52 which controls the pressure increase of the brake hydraulic pressure to each wheel cylinder WCrr and WCfl.

These first and second pressure increasing valves 41, 42, 51, and 52 are formed by a two positional electromagnetic valve which can control connection/disconnection state of the valve. The first and the second pressure increasing valves 41, 42, 51, and 52 are formed as a normally open type valve which becomes connected state when the control current to the solenoid coil provided in the respective valves 41, 42, 51 and 52 becomes zero (non-energized state) and becomes disconnected state when the control current flows through the solenoid coil (energized state).

The hydraulic passages 40*a* and 50*a* between the first and the second pressure increasing valves 41, 42, 51 and 52 and the wheel cylinders WCrl, WCrr, WCfr, and WCfl are connected to the reservoirs 43 and 53, respectively through the portions of hydraulic passages 40*b* and 50*b* functioning as the pressure decreasing hydraulic passage. In the hydraulic passages 40*b* and 50*b*, the first and the second pressure decreasing valves 44, 45, 54, and 55 are respectively provided which are formed by a two positional electromagnetic valve which can control connection disconnection state of the valve. The first and the second pressure decreasing valves 44, 45, 54, and 55 are formed as a normally closed type valve which becomes disconnected state when the control current to the solenoid coil provided in the respective first and second pressure decreasing valves 44, 45, 54, and 55 becomes zero (non-energized state) and becomes connected state when the control current flows through the solenoid coil (energized state).

The hydraulic passages 40*c* and 50*c* which serve as the return hydraulic passages are provided between the reservoirs 43 and 53 and the hydraulic passages 40*a* and 50*a* which are the main hydraulic passages. The hydraulic passages 40*c* and 50*c* are provided with pumps 46 and 56 configured to be driven by a motor 47, which sucks and discharges the braking fluid from the reservoirs 43 and 53 toward the master cylinder 12 or toward the wheel cylinders WCrl, WCrr, WCfr, and WCfl.

The pumps 46 and 56 suck the brake fluid from the reservoirs 43 and 53 and discharge to the hydraulic passages 40*a* and 50*a* to supply the wheel cylinders WCrl, WCrr, WCfr, and WCfl with the brake fluid.

Further, the detected signals from wheel speed sensors Sfl, Srr, Sfr, and Srl provided in each wheel Wfl, Wfr and Wrl of the vehicle are inputted to the brake ECU 17. The brake ECU 17 calculates the wheel speed of each wheel, presumed vehicle body speed and slip ratio and so on, based on the detected signals from the wheel speed sensors Sfl, Srr, Sfr, and Srl. The brake ECU 17 executes the anti-skid control and so on, based on the calculation results.

Each control using the actuator 16 is executed at the brake ECU 17. For example, by outputting the control current which controls each type of control valves 41, 42, 44, 45, 51, 52, 54, and 55 provided in the actuator 16 and the motor 47 which drives the pumps, the brake ECU 17 controls the hydraulic pressure circuit provided in the actuator 16 to individually control the wheel cylinder pressures transmitted to the respective wheel cylinders WCrl, WCrr, WCfr, and WCfl. For example, the brake ECU 17 executes the anti-skid control which prevents wheels from locking by executing pressure decreasing, pressure maintaining and pressure increasing of the wheel cylinder pressure when a wheel slips upon braking operation or executes a stability control which allows to perform an ideal turning operation of the vehicle by suppressing the skidding tendency (under-steer or over steer tendency) by automatically increasing the wheel cylinder pressure of the control subject wheel.

The brake ECU 17 includes an operating amount obtaining portion (first detection result obtaining portion) 17*a*, a hydraulic pressure obtaining portion (second detection result obtaining portion) 17*b*, an operation direction determining portion 17*c*, a failure detection range switching portion 17*d*, a failure determining portion 17*e*, and an information control portion 17*f*.

The operating amount obtaining portion (first detection result obtaining portion) 17*a* obtains the operating amount of the brake pedal 11 (the operating amount associated with the brake operation: stroke) from the stroke sensor 11*c*. The operating amount obtaining portion 17*a* is the first detection result obtaining portion configured to obtain a first detection result (measurement value of the stroke) from the first sensor (stroke sensor 11*c*) configured to detect the first detection subject (operating amount of the brake pedal 11) associated with the brake operation in the brake system, and increasing with an increase in brake operating amount or a brake operating force.

The hydraulic pressure obtaining portion (second detection result obtaining portion) 17*b* obtains the reaction force hydraulic pressure from the pressure sensor 25*b*. The hydraulic pressure obtaining portion 17*b* is the second detection result obtaining portion configured to obtain a second detection result (measurement value of the reaction force hydraulic pressure) from the second sensor (pressure sensor 25*b*) configured to detect the second detection subject (reaction force hydraulic pressure) having a mutual relationship with respect to the first detection subject (operating amount of the brake pedal 11: stroke), and associated with the brake operation in the brake system, and increasing with an increase of the brake operating amount or the brake operating force.

The first detection result obtaining portion may obtain an operating force detected by a sensor configured to detect an operating force (depressing force) applied directly to the brake pedal 11 instead of the operating amount of the brake pedal 11.

In the system of this embodiment, the second detection subject is the reaction force hydraulic pressure. However, for example, in other systems in which an input piston and a master piston are mechanically coupled, the second detection subject may be a master cylinder pressure.

The operation direction determining portion 17*c* determines the direction of operation of respective outputs from the stroke sensor 11*c* and the pressure sensor 25*b*, including an advancing operation direction and a returning operation direction, from a detection result of the stroke (first detection result) obtained by the operating amount obtaining portion 17*a* and a detection result of the reaction force hydraulic pressure (second detection result) obtained by the hydraulic pressure obtaining portion 17*b*. The measurement value of the stroke and the measurement value of the reaction force hydraulic pressure are associated with each other at the measurement time (detection time), and are associated, for example, as being measured (detected) at the same time.

Figure 3:
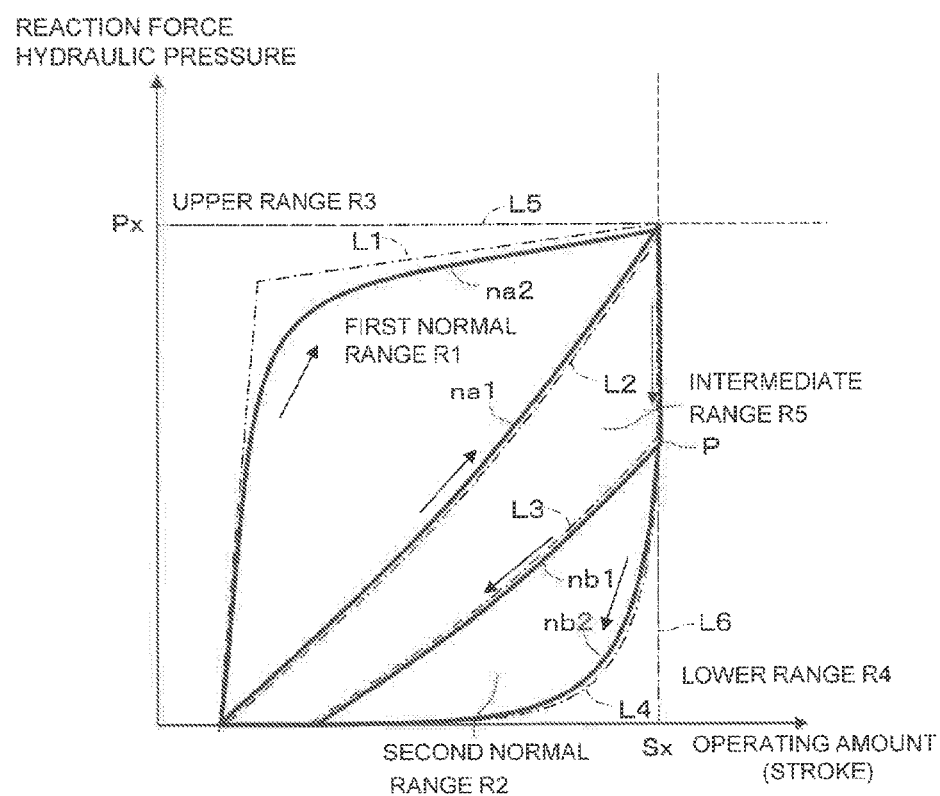
FIG. 3 is a drawing for explaining a failure detection range. A lateral axis indicates a stroke, and a vertical axis indicates a reaction force hydraulic pressure.

When the brake system is normal, the stroke is increased when the brake pedal 11 is pressed, and accordingly, the reaction force hydraulic pressure increases in response to an increase in stroke. In other words, as shown in FIG. 3, when the brake pedal 11 is pressed, the respective outputs from the stroke sensor 11c and the pressure sensor 25b increase. At this time, outputs from the stroke sensor 11c and the pressure sensor 25b are of the advancing operation. The advancing operation includes a plurality of operating routes (advancing operation routes) in accordance with the depressing speed of the brake pedal 11 (increased speed). When the depressing speed is slow, an advancing operation route na1 becomes a substantially straight line. When the depressing speed is fast, an advancing operation route na2 becomes a polygonal line. As the depressing speed increases, a rising degree of the operation route increases.

In contrast, when the brake pedal 11 is returning, the stroke decreases, and accordingly, the reaction force hydraulic pressure also decreases in response to a decrease in stroke. In other words, as shown in FIG. 3, when the brake pedal 11 is returned, the respective outputs from the stroke sensor 11c and the pressure sensor 25b decrease. At this time, outputs from the stroke sensor 11c and the pressure sensor 25b are of the returning operation. The returning operation includes a plurality of operating routes (returning operation routes) in accordance with the returning speed of the brake pedal 11 (decreased speed) in the same manner as the advancing operation. When the returning speed is low, a returning operation route nb1 becomes a polygonal line. The returning operation route nb1 becomes a route dropping to a bent point P during a short period after the returning operation is started, and subsequently, decreasing in a substantially straight line. This is because there is a hysteresis between the outputs of the stroke and the reaction force hydraulic pressure (the mutual relationship between the stroke and the reaction force hydraulic pressure). When the returning speed is high, a returning operation route nb2 becomes a substantially polygonal line with a smaller bent angle than the case where the returning speed is low. As the returning speed increases, a falling degree of the operation route increases.

The maximum value Sx of the stroke is defined by a bottoming (a state in which the brake pedal 11 is depressed to the maximum). The maximum value Px of the reaction force hydraulic pressure is defined by a hydraulic pressure corresponding to the stroke at the time of bottoming. A boundary line when the reaction force hydraulic pressure is at the maximum value Px is indicated by L5, and a boundary line when the stroke is at the maximum value Sx is indicated by L6.

Based on the configuration as described above, the operation direction determining portion 17c obtains a measurement value of the stroke and a measurement value of the reaction force hydraulic pressure, and calculates amounts of change for the measurement value of the stroke and the measurement value of the reaction force hydraulic pressure, respectively. The operation direction determining portion 17c determines that the direction of operation is a direction of the advancing operation (depressing operation) when both of the amount of change of the stroke and the amount of change of the reaction force hydraulic pressure are positive values (that is, a case where both of the measurement value of the stroke and the measurement value of the reaction force hydraulic pressure increase). The operation direction determining portion 17c also determines that the direction of operation is a direction of the returning operation (returning operation) when both of the amount of change of the stroke and the amount of change of the reaction force hydraulic pressure are negative values (that is, a case where both of the measurement value of the stroke and the measurement value of the reaction force hydraulic pressure decrease).

The failure detection range switching portion 17d switches a failure detection range for detecting the failure of the brake system caused by an abnormality of the mutual relationship between the first detection subject and the second detection subject in accordance with the direction of operation determined by the operation direction determining portion 17c. The failure of the brake system includes a leakage of an operating fluid from any part, the abnormality in opening and closing the electromagnetic control valve (abnormality in energization, the abnormality of the electromagnetic valve itself), and the abnormality of the stroke sensor 11c and the pressure sensor 25b, and the like.

The failure detection range is comprised of at least one of a first normal range R1, a second normal range R2, an upper range R3, a lower range R4, and an intermediate range R5.

The first normal range R1 is a range in which the brake system is normal when the direction of operation is the advancing operation direction. The first normal range R1 is set to include all the patterns of the advancing operation, which is an operation of depressing the brake pedal 11, and, for example, is set to a range from the advancing operation route na1 in which the depressing speed is slow to the advancing operation route na2 in which the depressing speed is high. As shown in FIG. 3, the first normal range R1 is defined by a boundary line L1 and a boundary line L2. The boundary line L1 is arranged along the advancing operation route na2, but slightly above the advancing operation route na2. The boundary line L2 is arranged along the advancing operation route na1 but right below the advancing operation route na1.

In the advancing operation, when the measurement value of the stroke and the measurement value of the reaction force hydraulic pressure are within the first normal range R1, the brake system is determined to be normal. On the other hand, when the measurement value of the stroke and the measurement value of the reaction force hydraulic pressure are out of the first normal range R1, the brake system is determined to be abnormal (failure).

The second normal range R2 is a range in which the reaction force hydraulic pressure at the time when a value thereof is the same with the value of the stroke is smaller than the first normal range R1 (positioned directly downward the first normal range R1) at the same time the brake system is normal when the direction of operation is the returning operation direction. The second normal range R2 is set to include all the patterns of the returning operation, which is an operation of returning the brake pedal 11 and, for example, is set to a range from the returning operation route nb1 in which the returning speed is low to the returning operation route nb2 in which the returning speed is high. As shown in FIG. 3, the second normal range R2 is defined by a boundary line L3 and a boundary line L4. The boundary line L3 is arranged along the returning operation route nb1, but slightly above the returning operation route nb1. The boundary line L4 is arranged along the returning operation route nb2, but right below the returning operation route nb1.

In the returning operation, when the measurement values of the stroke and the measurement value of the reaction force hydraulic pressure are within the second normal range R2, the brake system is determined to be normal. On the other hand, when the measurement values of the stroke and the measurement value of the reaction force hydraulic pressure are out of the second normal range R2, the brake system is determined to be abnormal (failure).

The upper range R3 is a range (positioned above the first normal range R1) in which the reaction force hydraulic pressure at the time when the value thereof is the same with the value of the stroke is larger than the first normal range R1. The upper range R3 is a range above the boundary line L1. The upper range R3 includes a case where the reaction force hydraulic pressure is larger than the maximum value Px. At this time, it is preferable that the stroke is smaller than the maximum value Sx.

The lower range R4 is a range (positioned below the second normal range R2) in which the reaction force hydraulic pressure at the time when the value thereof is the same with the value of the stroke is smaller than the second normal range R2. The lower range R4 is a range below the boundary line L4. The lower range R4 includes also a case where the stroke is larger than the maximum value Sx. At this time, it is preferable that the reaction force hydraulic pressure is smaller than the maximum value Px.

The intermediate range R5 is a range located between the first normal range R1 and the second normal range R2. The intermediate range R5 is a range surrounded by the boundary line L2 and the boundary line L3.

The failure detection range switching portion 17d switches the range which is comprised of the upper range R3, the intermediate range R5, the second normal range R2, and the lower range R4 as the failure detection range when the direction of operation is the advancing operation direction. Accordingly, when the measurement value of the stroke and the measurement value of the reaction force hydraulic pressure are within the first normal range R1 at the time of advancing operation, the brake system is determined to be normal. In contrast, when the measurement value of the stroke and the measurement value of the reaction force hydraulic pressure are out of the first normal range R1 at the time of advancing operation, the brake system is determined to be abnormal (failure).

In contrast, the failure detection range switching portion 17d switches the range which is comprised of the upper range R3, the first normal range R1, the intermediate range R5, and the lower range R4 as the failure detection range when the direction of operation is the returning operation direction. Accordingly, when the measurement value of the stroke and the measurement value of the reaction force hydraulic pressure are within the second normal range R2 at the time of returning operation, the brake system is determined to be normal. In contrast, when the measurement value of the stroke and the measurement value of the reaction force hydraulic pressure are out of the second normal range R2 at the time of returning operation, the brake system is determined to be abnormal (failure).

It is note that the failure detection range switching portion 17d may switch the range which is comprised of the upper range R3 and the lower range R4 as the failure detection range when the direction of operation is the returning operation direction. Accordingly, when the measurement value of the stroke and the measurement value of the reaction force hydraulic pressure are within the upper range R3 and the lower range R4 at the time of returning operation, the brake system may be determined to be abnormal (failure). Therefore, upon returning operation, the failure detection range can be limited to a smaller range and at the same time can be limited to a range which is not affected by the hysteresis.

In addition, the failure detection range switching portion 17d switches the range which is comprised of the upper range R3 and the lower range R4 as the failure detection range after the direction of operation is changed from the advancing operation direction to the returning operation direction and then is changed again to the advancing operation direction. The reason why the failure detection range is comprised of the upper range R3 and the lower range R4 is as follows. When the direction of operation is changed again to the advancing operation direction, the advancing operation route needs to pass at least through the intermediate area R5, and thus the intermediate area R5 needs to be excluded from the failure detection range. Also, the advancing operation route in the first normal range R1 depends on the depressing speed of the brake pedal 11, and accordingly, it is not certain which areas the advancing operation route passes in the first normal range R1. Therefore, the first normal range R1 needs to be excluded from the failure detection range.

At this time, a determination threshold value which determines that the direction of operation is changed from the advancing operation direction to the returning operation direction and then is changed again to the advancing operation direction is preferably variable in accordance with the detection result of the stroke sensor 11c and the detection result of the pressure sensor 25b. When the direction of operation is changed from the advancing operation direction to the returning operation direction and then is changed again to the advancing operation direction, the outputs from the stroke sensor 11c and the pressure sensor 25b are changed from decreasing to increasing, then increase from the returning operation route to the advancing operation route, and increase again along the advancing operation route. At this time, determination of whether the outputs increase again along the advancing operation route is determination that the direction is changed again to the advancing operation direction. Therefore, the determination threshold value is preferably set in accordance with the output at the time of being changed from decreasing to increasing and the amount of hysteresis. In this embodiment, when the operating speed of the brake pedal 11 is slow, the smaller the measurement value of the stroke at the time of changing from decreasing to increasing, the smaller the hysteresis amount becomes, and therefore. it is preferable to set such that the larger the measurement value of the stroke at the time of changing from decreasing to increasing, the larger the determination threshold value (the amount corresponding to the increase of the reaction threshold value) is set.

The failure determining portion 17e determines the failure of the brake system from the failure detection range switched by the failure detection range switching portion 17d, the measurement value of the stroke (operating amount) obtained by the operating amount obtaining portion 17a, and the measurement value of the reaction force hydraulic pressure (hydraulic pressure) obtained by the hydraulic pressure obtaining portion 17b. Specifically, the failure determining portion 17e determines that the brake system has a failure when the measurement value of the stroke and the measurement value of the reaction force hydraulic pressure are within the failure detection range, and determines that the brake system does not have a failure (normal) when these measurement values are out of the failure detection range.

When an abnormality is determined by the failure determining portion 17e, the information control portion 17f issues an instruction to an information portion 18 so as to control information indicating that the brake is abnormal. The information portion 18 is comprised of a display and a speaker and the like, and displays and announces an abnormality of the brake system in accordance with the information instruction.

Figure 4:
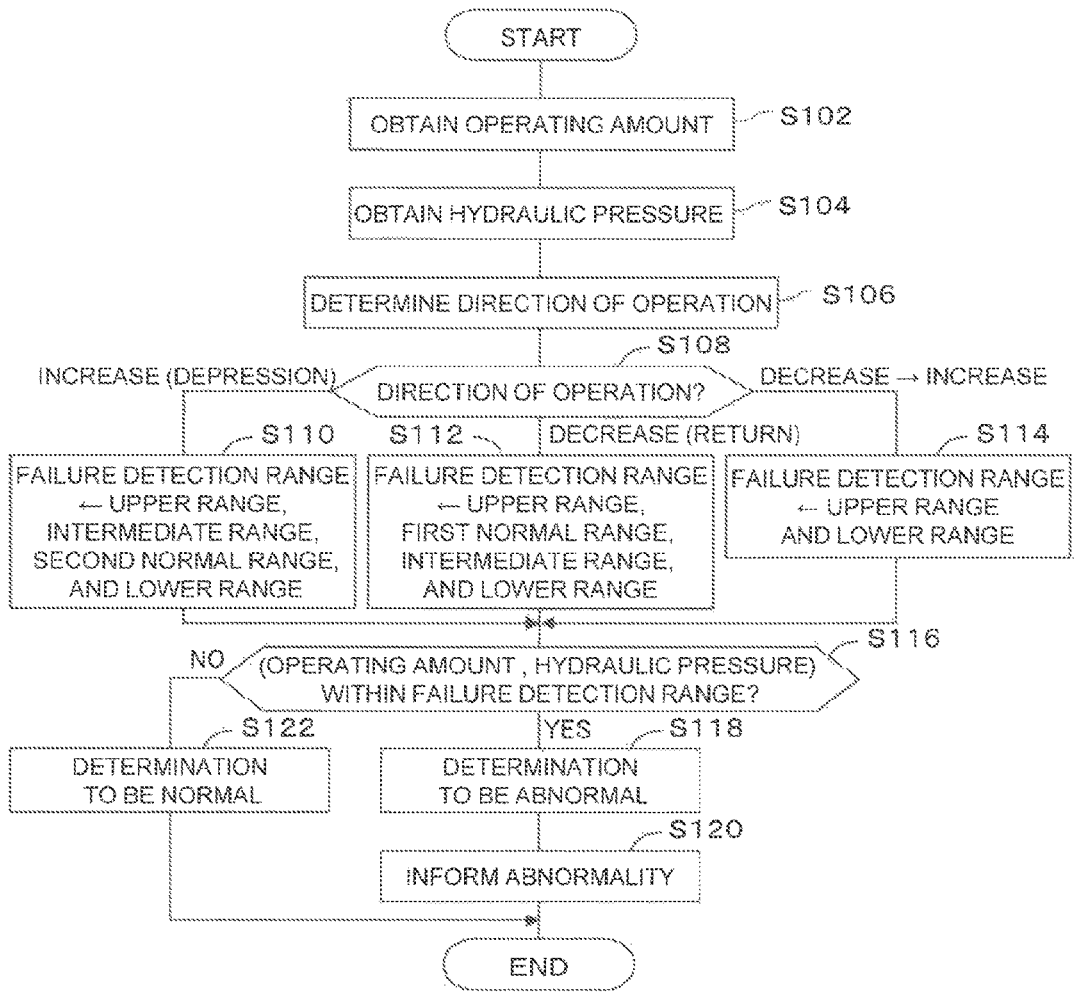
FIG. 4 is a flowchart of a control program to be executed by the brake ECU illustrated in FIG. 1.

In addition, the above-described operation performed by the brake system will be described in accordance with a flowchart illustrated in FIG. 4. The brake ECU 17 executes a program in accordance with the flowchart at every predetermined short period.

The brake ECU 17 obtains the operating amount of the brake pedal 11 from the stroke sensor 11c in the same manner as the above-described operating amount obtaining portion 17a in Step S102.

The brake ECU 17 obtains the reaction force hydraulic pressure from the pressure sensor 25b in the same manner as the above-described hydraulic pressure obtaining portion 17b in Step S104.

In Step S106, the brake ECU 17 determines the directions of operation of the outputs from the stroke sensor 11c and the pressure sensor 25b from the measurement value of the stroke obtained by the operating amount obtaining portion 17a and the measurement value of the reaction force hydraulic pressure obtained by the hydraulic pressure obtaining portion 17b in the same manner as the above-described operation direction determining portion 17c.

In Step S108 to Step S114, the brake ECU 17 switches the failure detection range for detecting failures of the brake system in accordance with the direction of operation determined in Step S106 in the same manner as the above-described failure detection range switching portion 17d. In Step S108, whether the direction of operation is an increasing direction or a decreasing direction, and a switching from the decreasing direction to the increasing direction is determined. In Step S110, when the direction of operation is the increasing direction, that is, the advancing operation direction, the failure detection range is switched to a range which is comprised of the upper range R3, the intermediate range R5, the second normal range R2, and the lower range R4. In Step S112, when the direction of operation is the decreasing direction, that is, the returning operation direction, the failure detection range is switched to a range which is comprised of the upper range R3, the first normal range R1, the intermediate range R5, and the lower range R4. In Step S114, when the direction of operation is changed from the advancing operation direction to the returning operation direction, and then is changed again to the advancing operation direction, the failure detection range is switched to a range which is comprised of the upper range R3 and the lower range R4.

The brake ECU 17 determines the failure of the brake system in the same manner as the above-described failure determining portion 17e in Step S116, Step S118, and Step S122. In Step S116, the brake ECU 17 determines whether or not the measurement value of the stroke and the measurement value of the reaction force hydraulic pressure are within the failure detection range. In Step S118, the brake ECU 17 determines that the brake system has the failure when the measurement value of the stroke and the measurement value of the reaction force hydraulic pressure are within the failure detection range. In Step S122, the brake ECU 17 determines that the brake system does not have a failure (normal) when the measurement value of the stroke and the measurement value of the reaction force hydraulic pressure are out of the failure detection range.

When the brake system is determined to be abnormal, the brake ECU 17 issues an instruction to the information portion 18 so as to control information indicating that the brake system is abnormal in the same manner as the above-described information control portion 17f in Step S120.

As is apparent from the description given above, the invention of the brake ECU 17 (abnormality detection device) of this embodiment includes: the operating amount obtaining portion 17a (first detection result obtaining portion) configured to obtain the measurement value of the stroke (first detection result) from the stroke sensor 11c (first sensor) configured to detect the stroke (first detection subject) associated with the brake operation in the hydraulic pressure braking force generating device A (brake system) and increasing with an increase of the brake operating amount or the brake operating force; the hydraulic pressure obtaining portion 17b (second detection result obtaining portion) configured to obtain the measurement value of the reaction force hydraulic pressure (second detection result) from the pressure sensor 25b (second sensor) configured to detect the reaction force hydraulic pressure (second detection subject) having a mutual relationship with respect to the stroke, associated with the brake operation in the hydraulic pressure braking force generating device A, and increasing with an increase of the brake operating amount or the brake operating force; the operation direction determining portion 17c configured to determine the directions of operation of the outputs from the stroke sensor 11c and the pressure sensor 25b, including an advancing operation direction and a returning operation direction, from the measurement value of the stroke obtained by the operating amount obtaining portion 17a and the measurement value of the reaction force hydraulic pressure obtained by the hydraulic pressure obtaining portion 17b; the failure detection range switching portion 17d configured to switch the failure detection range for detecting a failure of the hydraulic pressure braking force generating device A in accordance with the direction of operation determined by the operation direction determining portion 17c; and the failure determining portion 17e configured to determine the failure of the hydraulic pressure braking force generating device A from the failure detection range switched by the failure detection range switching portion 17d, the measurement value of the stroke obtained by the operating amount obtaining portion 17a, and the measurement value of the reaction force hydraulic pressure obtained by the hydraulic pressure obtaining portion 17b.

In this configuration, the failure determining portion 17e can adopt the failure detection range switched adequately in response to the direction of operation of the output from the stroke sensor 11c and the pressure sensor 25b, and then the failure determining portion 17e can determine the failure of the hydraulic pressure braking force generating device A in every operation direction. Consequently, even though there is hysteresis in the mutual relationship between the output from the stroke sensor 11c and the output from the pressure sensor 25b, further improvement of the failure detection accuracy of the hydraulic pressure braking force generating device A is achieved.

Also, the failure detection range is comprised of at least one of the first normal range R1 in which the hydraulic pressure braking force generating device A is normal when the direction of operation is the advancing operation direction, the second normal range R2 in which the hydraulic pressure braking force generating device A is normal when the reaction force hydraulic pressure at the time when a value thereof is the same with the value of the stroke is smaller than the first normal range R1 (located below the first normal range R1) and when the direction of operation is the returning operation direction, the upper range R3 in which the reaction force hydraulic pressure at the time when the value thereof is the same with the value of the stroke is larger than the first normal range R1 (located above the first normal range R1), the lower range R4 in which the reaction force hydraulic pressure at the time when the value thereof is the same with the value of the stroke is smaller than the second normal range R2 (located below the second normal range R2), and the intermediate range R5 located between the first normal range R1 and the second normal range R2, the failure detection range switching portion 17d switches the failure detection range to the range which is comprised of the upper range R3, the intermediate range R5, the second normal range R2, and the lower range R4 when the direction of operation is the advancing operation direction, on the other hand, switches the failure detection range to the range which is comprised of the upper range R3, the first normal range R1, the intermediate range R5, and the lower range R4 when the direction of operation is the returning operation direction.

In this configuration, when the advancing operation and the returning operation routes are different from each other due to the hysteresis, the failure detection range can be limited to be narrow and a range not affected by the hysteresis at the time of returning operation after the hydraulic pressure braking force generating device A is determined to be normal at the time of advancing operation. Therefore, further improvement of the failure detection accuracy of the hydraulic pressure braking force generating device A is achieved.

In addition, the failure detection range switching portion 17d may be configured to switch the failure detection range to the range which is comprised of the upper range R3, the intermediate range R5, the second normal range R2, and the lower range R4 when the direction of operation is the advancing operation direction, and, on the other hand, switch the failure detection range to the range which is comprised of the upper range R3 and the lower range R4 when the direction of operation is the returning operation direction.

In this configuration, when the advancing operation and the returning operation routes are different from each other due to the hysteresis, the failure detection range can be limited to be further narrow and a range not affected by the hysteresis at the time of returning operation after the hydraulic pressure braking force generating device A is determined to be normal at the time of advancing operation.

In addition, the failure detection range switching portion 17d switches the failure detection range to the range which is comprised of the upper range R3 and the lower range R4 after the direction of operation is changed from the advancing operation direction to the returning operation direction and then is changed again to the advancing operation direction.

In this configuration, when the direction of operation is changed from the advancing operation direction to the returning operation direction and then changed again to the advancing operation direction, the failure detection range can be set adequately, so that further improvement of the failure detection accuracy of the hydraulic pressure braking force generating device A is achieved.

Also, the determination threshold value which determines that the direction of operation is changed from the advancing operation direction to the returning operation direction and then is changed again to the advancing operation direction is variable in accordance with the respective results of detection of the stroke sensor 11c and the pressure sensor 25b.

In this configuration, the change of the direction of operation from the advancing operation direction to the returning operation direction, and the change from the returning operation direction to the advancing operation direction can be determined accurately. Consequently, further improvement of the failure detection accuracy of the hydraulic pressure braking force generating device A is achieved.

Second Embodiment

The invention of the brake ECU 17 according to a second embodiment includes: the operating amount obtaining portion 17a configured to obtain the measurement value of the stroke from the stroke sensor 11c configured to detect the stroke associated with the brake operation in the hydraulic pressure braking force generating device A; the hydraulic pressure obtaining portion 17b configured to obtain the measurement value of the reaction force hydraulic pressure from the pressure sensor 25b configured to detect the reaction force hydraulic pressure having the mutual relationship with the stroke and associated with the brake operation in the hydraulic pressure braking force generating device A; and the failure determining portion 17e configured to determine the failure of the hydraulic pressure braking force generating device A from the failure detection range for detecting the failure of the hydraulic pressure braking force generating device A, the measurement value of the stroke obtained by the operating amount obtaining portion 17a, and the measurement value of the reaction force hydraulic pressure obtained by the hydraulic pressure obtaining portion 17b, and the failure determining portion 17e excludes the areas of the measurement value of the stroke and the measurement value of the reaction force hydraulic pressure where the failure determination of the hydraulic pressure braking force generating device A has been already performed from a determination target and performs the failure determination of the hydraulic pressure braking force generating device A for the measurement value of the stroke and the measurement value of the reaction force hydraulic pressure where the failure determination is not performed, other than the areas thereof where the failure determination has been already performed, while one operation of the brake operation (during one brake operation).

Figure 5:
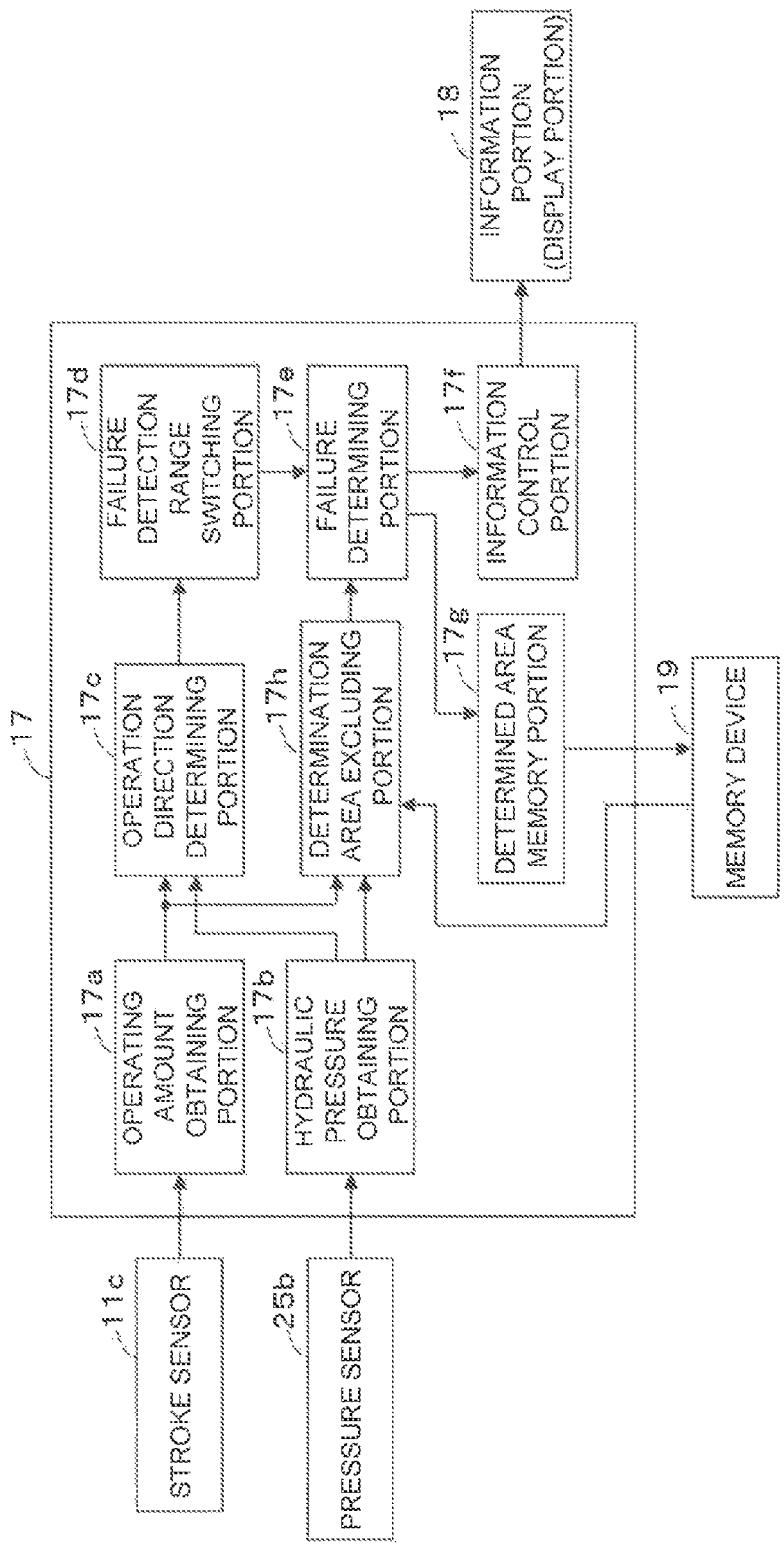
FIG. 5 is a block diagram of the brake ECU of the abnormality detection device according to a second embodiment of the present invention.

Specifically, the brake ECU 17 further includes a determined area memory portion 17g and a determination area excluding portion 17h as shown in FIG. 5.

The determined area memory portion 17g obtains an area of the measurement value of the stroke and the measurement value of the reaction force hydraulic pressure, where the failure determination has already been performed, from the failure determining portion 17e, and stores the obtained area in a memory device 19 as a determined area.

The determination area excluding portion 17h obtains the determined area from the memory device 19 and excludes the determined area from the determination target, while one operation of the brake operation (during one brake operation). Accordingly, the failure determining portion 17e performs determination of the failure of the hydraulic pressure braking force generating device A only for the determination target which the failure determination has not been executed.

Figure 6:
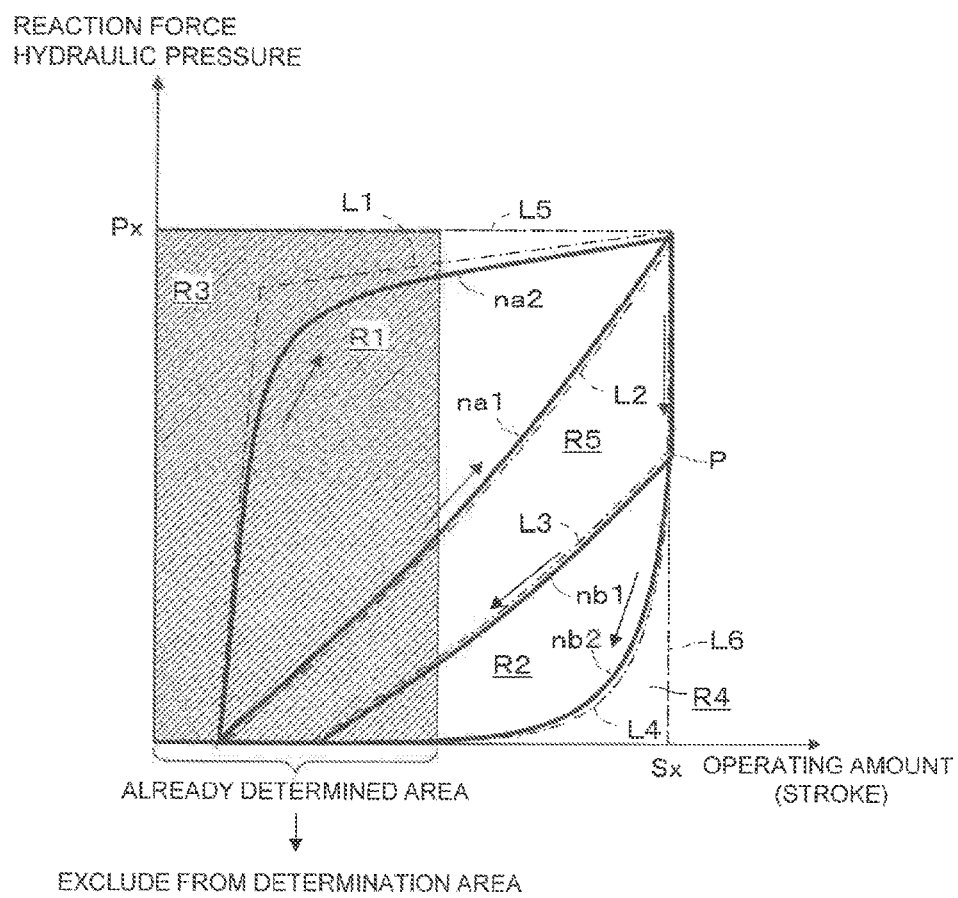
FIG. 6 is a drawing for explaining an operation of the second abnormality detection device according to the second embodiment of the present invention. A lateral axis indicates a stroke, and a vertical axis indicates a reaction force hydraulic pressure.

For example, as shown in FIG. 6, a hatched area is the determined area, and an area on the right side of the hatched area is an undetermined area. When the measurement value of the stroke and the measurement value of the reaction force hydraulic pressure are within the determined area, determination of the failure of the hydraulic pressure braking force generating device A is not performed. In contrast, when the measurement value of the stroke and the measurement value of the reaction force hydraulic pressure are within the undetermined area, determination of the failure of the hydraulic pressure braking force generating device A is performed.

Figure 7:
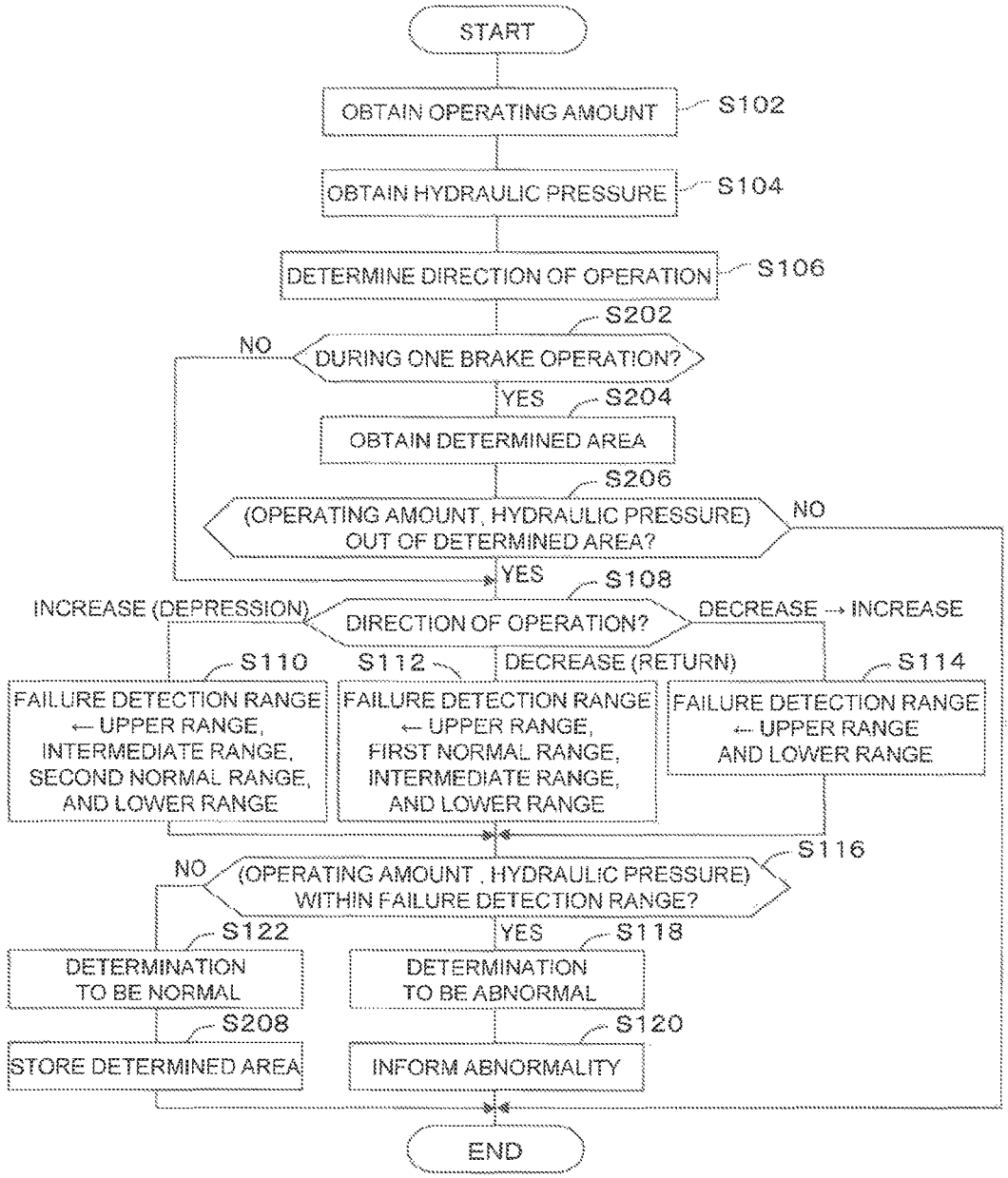
FIG. 7 is a flowchart of a control program to be executed by the brake ECU illustrated in FIG. 5.

In addition, the above-described operation performed by the brake system will be described in accordance with a flowchart illustrated in FIG. 7. The brake ECU 17 executes a program in accordance with the flowchart at every predetermined short period. Points different from the flowchart of the first embodiment described above will be described. Like contents are designated by like reference numerals and the description will be omitted.

In Step S202, the brake ECU 17 determines whether is during the one operation of the brake operation (during the one brake operation) or not. As used herein, the term "during the one brake operation" is intended to include an operation from a start of the depression of the brake pedal 11 until an end of the depression, and the advancing operation route and the returning operation route constitute one closed circuit by being connected to each other. Whether the one brake operation is being performed or not can be determined by whether the advancing operation route and the returning operation route constitute one closed circuit by being connected to each other or not.

When the one brake operation is performed, the brake ECU 17 obtains (reads) the determined area from the memory device 19 in Step S204. Then, the brake ECU 17 does not perform the failure determination when the measurement value of the stroke and the measurement value of the reaction force hydraulic pressure are within the determined area (when determined to be NO in Step S206). In contrast, the brake ECU 17 advances the program to Step S108 onward and performs the failure determination when the measurement value of the stroke and the measurement value of the reaction force hydraulic pressure are out of the determined area (when determined to be YES in Step S206).

After the determination that the brake system is normal (Step S122) is performed in Step 208, the brake ECU 17 stores areas, in which the failure determination has already been performed, of the measurement value of the stroke and the measurement value of the reaction force hydraulic pressure in the memory device 19 as the determined areas.

According to the brake ECU 17 of the second embodiment described above, the areas of the measurement value of the stroke and the measurement value of the reaction force hydraulic pressure determined to be normal during the one operation of the brake operation can be omitted in the failure determination of the hydraulic pressure braking force generating device A from then onward. Consequently, further improvement of the failure detection accuracy of the hydraulic pressure braking force generating device A is achieved.

REFERENCE SIGNS LIST

11 . . . brake pedal, 12 . . . master cylinder, 13 . . . stroke simulator portion, 14 . . . reservoir, 15 . . . booster mechanism, 15a . . . regulator, 15b . . . pressure supplying device (drive portion), 15b1 . . . reservoir (low pressure source), 15b2 . . . accumulator (high pressure source), 15b6 . . . pressure decreasing valve, 15b7 . . . pressure increasing valve, 16 . . . actuator, 17 . . . brake ECU (abnormality detection device), 17a . . . operating amount obtaining portion (first detection result obtaining portion), 17b . . . hydraulic pressure obtaining portion (second detection result obtaining portion), 17c . . . operation direction determining portion, 17d . . . failure detection range switching portion, 17e . . . failure determining portion, 17f . . . information control portion, 17g . . . determined area memory portion, 17h . . . determination area excluding portion, A . . . hydraulic pressure braking force generating device (brake system), WC . . . wheel cylinder

The invention claimed is:

1. An abnormality detection device comprising: a first detection result obtaining portion configured to obtain a first detection result from a first sensor configured to detect a first detection subject associated with a brake operation in a brake system and increasing with an increase of a brake operating amount or a brake operating force;
   a second detection result obtaining portion configured to obtain a second detection result from a second sensor configured to detect a second detection subject having a mutual relationship with respect to the first detection subject and associated with the brake operation in the brake system and increasing with an increase of the brake operating amount or the brake operating force;
   an operation direction determining portion configured to determine a direction of operation of outputs from the first sensor and the second sensor, including an advancing operation direction and a returning operation direction, from the first detection result obtained by the first detection result obtaining portion and the second detection result obtained by the second detection result obtaining portion;
   a failure detection range switching portion configured to switch a failure detection range for detecting a failure of the brake system caused by an abnormality of a mutual relationship between the first detection subject and the second detection subject in accordance with the direction of operation determined by the operation direction determining portion; and
   a failure determining portion configured to determine a failure of the brake system from the failure detection range switched by the failure detection range switching portion, the first detection result obtained by the first detection result obtaining portion, and the second detection result obtained by the second detection result obtaining portion.

2. The abnormality detection device according to claim 1, wherein the failure detection range is comprised of at least one of
   a first normal range in which the brake system is normal when the direction of operation is the advancing operation direction,
   a second normal range in which the second detection subject at the time when a value thereof is the same with the value of the first detection subject is smaller than the first normal range and at the same time the brake system is normal when the direction of operation is the returning operation direction;
   an upper range in which the second detection subject at the time when the value thereof is the same with the value of the first detection subject is larger than the first normal range;
   a lower range in which the second detection subject at the time when the value thereof is the same with the value of the first detection subject is smaller than the second normal range; and
   an intermediate range located between the first normal range and the second normal range, and
   the failure detection range switching portion switches the failure detection range to a range which is comprised of the upper range, the intermediate range, the second normal range, and the lower range when the direction of operation is the advancing operation direction, and switches the failure detection range to a range which is comprised of the upper range, the first normal range, the intermediate range, and the lower range when the direction of operation is the returning operation direction.

3. The abnormality detection device according to claim 1, wherein the failure detection range is comprised of at least one of a first normal range in which the brake system is normal when the direction of operation is the advancing operation direction;

a second normal range in which the second detection subject at the time when a value thereof is the same with the value of the first detection subject is smaller than the first normal range and at the same time the brake system is normal when the direction of operation is the returning operation direction;

an upper range in which the second detection subject at the time when the value thereof is the same with the value of the first detection subject is larger than the first normal range;

a lower range in which the second detection subject at the time when the value thereof is the same with the value of the first detection subject is smaller than the second normal range; and an intermediate range located between the first normal range and the second normal range, and the failure detection range switching portion switches the failure detection range to a range which is comprised of the upper range, the intermediate range, the second normal range, and the lower range when the direction of operation is the advancing operation direction, and switches the failure detection range to a range which is comprised of the upper range and the lower range when the direction of operation is the returning operation direction.

4. The abnormality detection device according to claim 1, wherein the failure detection range is comprised of at least one of a first normal range in which the brake system is normal when the direction of operation is the advancing operation direction, a second normal range in which the second detection subject at the time when a value thereof is the same with the value of the first detection subject is smaller than the first normal range and at the same time the brake system is normal when the direction of operation is the returning operation direction;

an upper range in which the second detection subject at the time when the value thereof is the same with the value of the first detection subject is larger than the first normal range;

a lower range in which the second detection subject at the time when the value thereof is the same with the value of the first detection subject is smaller than the second normal range; and an intermediate range located between the first normal range and the second normal range, and the failure detection range switching portion switches the failure detection range to a range which is comprised of the upper range and the lower range after the direction of operation is changed from the advancing operation direction to the returning operation direction and then is changed again to the advancing operation direction.

5. The abnormality detection device according to claim 4, wherein a determination threshold value determining that the direction of operation is changed from the advancing operation direction to the returning operation direction and then is changed again to the advancing operation direction is variable in accordance with the first detection result of the first sensor and the second detection result of the second sensor.

6. An abnormality detection device comprising:

a first detection result obtaining portion configured to obtain a first detection result from a first sensor configured to detect a first detection subject associated with a brake operation in a brake system;

a second detection result obtaining portion configured to obtain a second detection result from a second sensor configured to detect a second detection subject having a mutual relationship with respect to the first detection subject and associated with the brake operation in the brake system; and a failure determining portion configured to perform a failure determination of the brake system from a failure detection range for detecting a failure of the brake system, the first detection result obtained by the first detection result obtaining portion, and the second detection result obtained by the second detection result obtaining portion, wherein the failure determining portion excludes the areas of the first detection result and the second detection result where the failure determination of the brake system has been already performed from a determination target and performs the failure determination of the brake system for the first detection result and the second detection result where the failure determination is not performed, other than the areas thereof where the failure determination has been already performed, while one operation of the brake operation.

* * * * *